United States Patent [19]
Goodell

[11] Patent Number: 6,116,280
[45] Date of Patent: Sep. 12, 2000

[54] SPRING BRAKE VALVE HAVING A BALANCE PISTON WITH INTEGRAL QUICK RELEASE

[76] Inventor: David J. Goodell, 8240 SW. 184th St., Beaverton, Oreg. 97007

[21] Appl. No.: 09/393,541

[22] Filed: Sep. 10, 1999

[51] Int. Cl.[7] .................................................. F16K 31/122
[52] U.S. Cl. ......................... 137/627.5; 137/102; 303/69
[58] Field of Search ................... 137/627.5, 102, 137/107, 843, 540, 513, 528; 303/69, 70, 71

[56] References Cited

U.S. PATENT DOCUMENTS

| | | | |
|---|---|---|---|
| Re. 32,885 | 3/1989 | Graham | 303/71 |
| 3,424,185 | 1/1969 | Lansky et al. | 137/102 |
| 3,743,364 | 7/1973 | Holmes | 137/107 |
| 3,920,046 | 11/1975 | Morse et al. | 137/627.5 |
| 4,004,603 | 1/1977 | Jones | 137/107 |
| 4,119,351 | 10/1978 | Durling | 303/69 |
| 4,407,548 | 10/1983 | Graham | 303/71 |
| 4,453,780 | 6/1984 | Neal | 137/102 |
| 4,461,313 | 7/1984 | Beaumont | 137/843 |
| 4,596,265 | 6/1986 | Goodell . | |
| 4,696,521 | 9/1987 | McCann et al. | 303/92 |
| 4,878,513 | 11/1989 | Ashby et al. | 137/102 |
| 5,286,095 | 2/1994 | Sell et al. | 303/71 |
| 5,425,572 | 6/1995 | Koelzer et al. | 137/102 |
| 5,458,403 | 10/1995 | Moody | 303/7 |

*Primary Examiner*—Gregory L. Huson
*Assistant Examiner*—Joanne Y. Kim

[57] ABSTRACT

A valve assembly for selectively controlling application of a spring brake in a truck brake system having primary and secondary circuits is provided. A spring brake valve is modified to incorporate a balance piston having an integral quick release valve. This reduces the number of components, complexity, and service problems while maintaining all of the advantages associated with monitoring the function of the primary circuit.

12 Claims, 5 Drawing Sheets

SPRING BRAKE VALVE HAVING A BALANCE PISTON WITH INTEGRAL QUICK RELEASE

BACKGROUND OF THE INVENTION

1. Field of the Invention

This invention relates to truck brake systems having primary and secondary circuits where provision is made for controlling a spring brake through a foot pedal in the absence of primary circuit function. More particularly, the application is directed to integrating a quick release valve into a spring brake valve.

2. Discussion of the Art

Presently available truck brake systems include primary and secondary pneumatic circuits for selective application of the vehicle brakes. Brake chambers are associated with a first or front steering axle and, likewise, brake chambers are provided for a second or rear drive axle. The brakes are applied by selectively depressing a foot pedal to actuate a control valve and deliver pressurized air from a primary or secondary reservoir to the brake chambers associated with the axles. The primary circuit supplies pneumatic pressure to the rear or drive axle brakes and the secondary circuit supplies air pressure to the front or steer axle brakes.

If the primary circuit fails, the secondary circuit is still available and is mechanically opened via a push-through force from the driver's foot to assure braking function to the steer axle. Spring brakes, which are large mechanically applied springs associated with the drive axle used to park the vehicle, are usually held in a release position by supplying air pressure to a spring brake chamber associated with the rear brakes. This allows the vehicle to roll. When air is exhausted from the spring brake chamber, the mechanical spring brake is actuated and performs the braking function. Thus, by selectively connecting the brake actuator to an exhaust port or atmosphere, the mechanical spring brake is selectively applied. In addition, if the primary circuit fails, the spring brake is applied and modulation of the braking function is provided through the foot control valve.

These known arrangements use a separate spring brake quick release valve. The quick release valve improves the response and allows air to exhaust from the spring brake chamber quickly. The quick release valve also maintains sensitivity of foot control in those situations where the primary circuit has failed. U.S. Pat. No. 4,596,265, commonly owned by the assignee of the present application, illustrates a known quick release valve used in a pneumatic pressure braking system. Separate lines lead from the quick release valve to the spring brake chambers and, in addition, a line interconnects the spring brake valve with the spring brake quick release valve. This arrangement requires a number of individual components such as the quick release valve housing, associated pneumatic lines, fittings or connectors, etc., and there are also attendant service issues related thereto. Moreover, customers find the present system overly complex and expensive to install.

SUMMARY OF THE INVENTION

The present invention provides an integrated spring brake quick release valve and spring brake valve that simplifies known, multi-component systems.

More particularly, the valve assembly includes a housing having a first port in communication with a primary circuit and a second port in communication with a secondary circuit. The first and second ports communicate with opposite faces of a control piston received in a chamber of the housing to monitor operation of the primary and secondary circuits. A third port of the housing communicates with a spring brake chamber, while a fourth port communicates with ambient or atmosphere. A valve member is received in the housing and interposed between the third and fourth ports for selectively connecting the spring brake chamber with ambient in response to a predetermined pressure differential between the first and second ports.

A valve member, preferably a diaphragm, selectively closes the fourth port and establishes communication between the spring brake chamber and a fifth port communicating with a park control valve.

The primary benefit of the invention is the ability to integrate the separate components into a multi-component arrangement in a single housing that has improved response time, while maintaining all of the features and benefits of known systems, including sensitivity of the foot control valve.

Another benefit is the ability to reduce the volume of air which contributes to the responsiveness of the assembly.

Still another benefit of the invention resides in the decreased installation costs associated with eliminating separate valves, pressure lines, fittings, and costs associated with servicing same.

The reduced number of potential leakage points and the simplified plumbing are other benefits of the application.

Still other features and benefits of the invention will become apparent to those skilled in the art upon reading and understanding the following detailed description.

DETAILED DESCRIPTION OF THE PREFERRED EMBODIMENT

Figure 1:
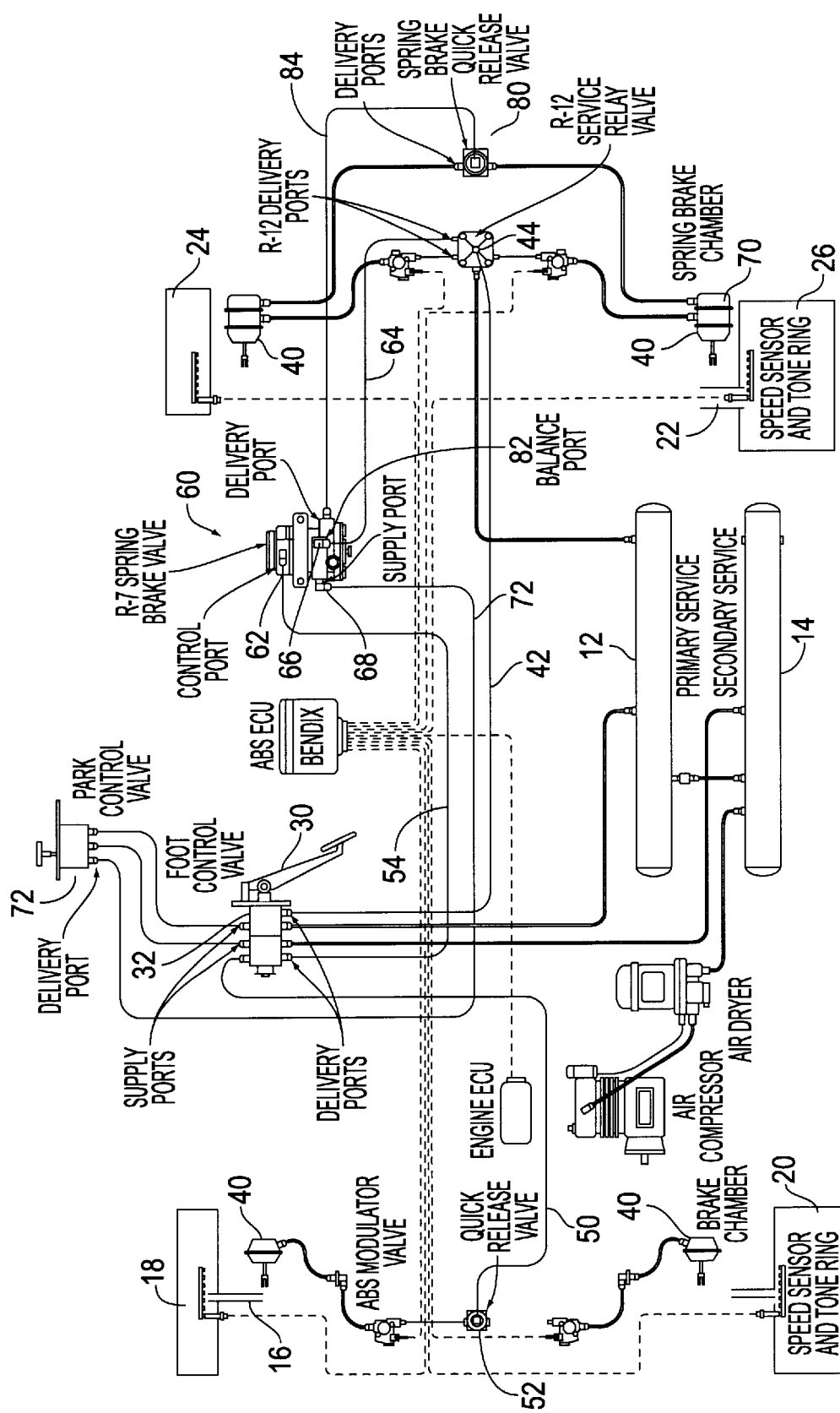
FIG. 1 is a schematic representation of a standard truck brake system.

Turning first to FIG. 1, a conventional truck brake system is illustrated schematically. It includes a compressor 10 that selectively charges primary and secondary reservoirs 12, 14. The compressed air is used to provide selective braking action to the front or steering axle 16 having wheels 18, 20 associated therewith. In addition, a second or rear, drive axle 22, having wheels 24, 26 associated therewith, is also under the control of the braking system. More particularly, a foot pedal 30 operates foot pedal control valve 32 which selectively interconnects compressed air from either the primary or secondary reservoirs to individual brake chambers 40 associated with each wheel. A primary circuit includes line 42 extending from the foot control valve to a relay valve 44. The relay valve provides air pressure to the drive axle to selectively control application of the brakes.

A secondary circuit includes line 50 also extending from the foot control valve to a quick release valve 52 associated with the steer axle 16. Again, by selectively depressing the foot control valve, air pressure is modulated to the front brake chambers 40. In addition, the secondary circuit includes line 54 extending from the quick release valve 52. The line connects to a spring brake valve 60, particularly a control port 62 thereof. In addition, line 64 leads from the relay valve 54 to a balance port 66 associated with the spring brake valve. In this manner, pressure from the primary circuit is provided to one side of a piston (not shown in FIG. 1) while air pressure from the secondary circuit is provided to the other side of the piston through control port 62. The spring brake valve thus monitors the operating state of the primary and secondary circuits. If both the primary and secondary systems are functioning then the balance piston has no impact on the braking function.

On the other hand, if the primary circuit fails, then the secondary circuit acts on the balance piston and urges it to an actuated position. The balance piston opens an inlet/exhaust valve to selectively provide air pressure from the secondary circuit to a spring brake chamber 70. Since the drive axle includes large mechanically applied spring brakes (not shown), pressure chambers are supplied with air to release the mechanical spring and allow the vehicle to roll. If the primary circuit failed, it is desirable to take advantage of the spring brakes, yet modulate the operation of the spring brakes through the foot control valve. This function is provided by the spring brake valve 60. Since the secondary circuit is still available in the absence of the primary circuit, the pressure acting on the balance piston allows the air in the spring brake chamber that normally keeps the spring brake in a release position to be exhausted. Thus, the spring brakes are selectively applied through the foot control valve operation. Pressure from the secondary circuit and the foot control valve is applied to the control port to open communication from the delivery port to the exhaust port and selectively apply the spring brakes. Upon releasing the foot control valve, the supply port 68 of the valve is then used to recharge the spring brake chamber. This releases the spring brake since the supply port is connected to park control valve 72 in the circuit (FIG. 1). Although not as responsive as the normal foot control operation with the primary circuit, this arrangement provides desired braking action and modulation when necessary.

In addition, and in an effort to speed up the pneumatic response, a spring brake quick release valve 80 is associated with a delivery port 82 of the spring brake valve. It is desired to provide a quick release of the circuit to improve the response and exhaust air from the spring brake chamber quickly. Thus as shown, the quick release valve 80 is connected to the balance port 82 via line 84. Opposite ends of the line are connected via conventional fittings to the respective valves 60, 80.

This system shown and described with respect to FIG. 1 is deemed to be excessively complex and expensive to install. A simplified version is desired that would be more cost effective to install. Thus, a need exists to eliminate components, complexity, reduce associated service problems, and improve the response while maintaining the ability to monitor primary system operation and take advantage of the spring brake in the system via a second circuit if the primary circuit fails.

Figure 2:
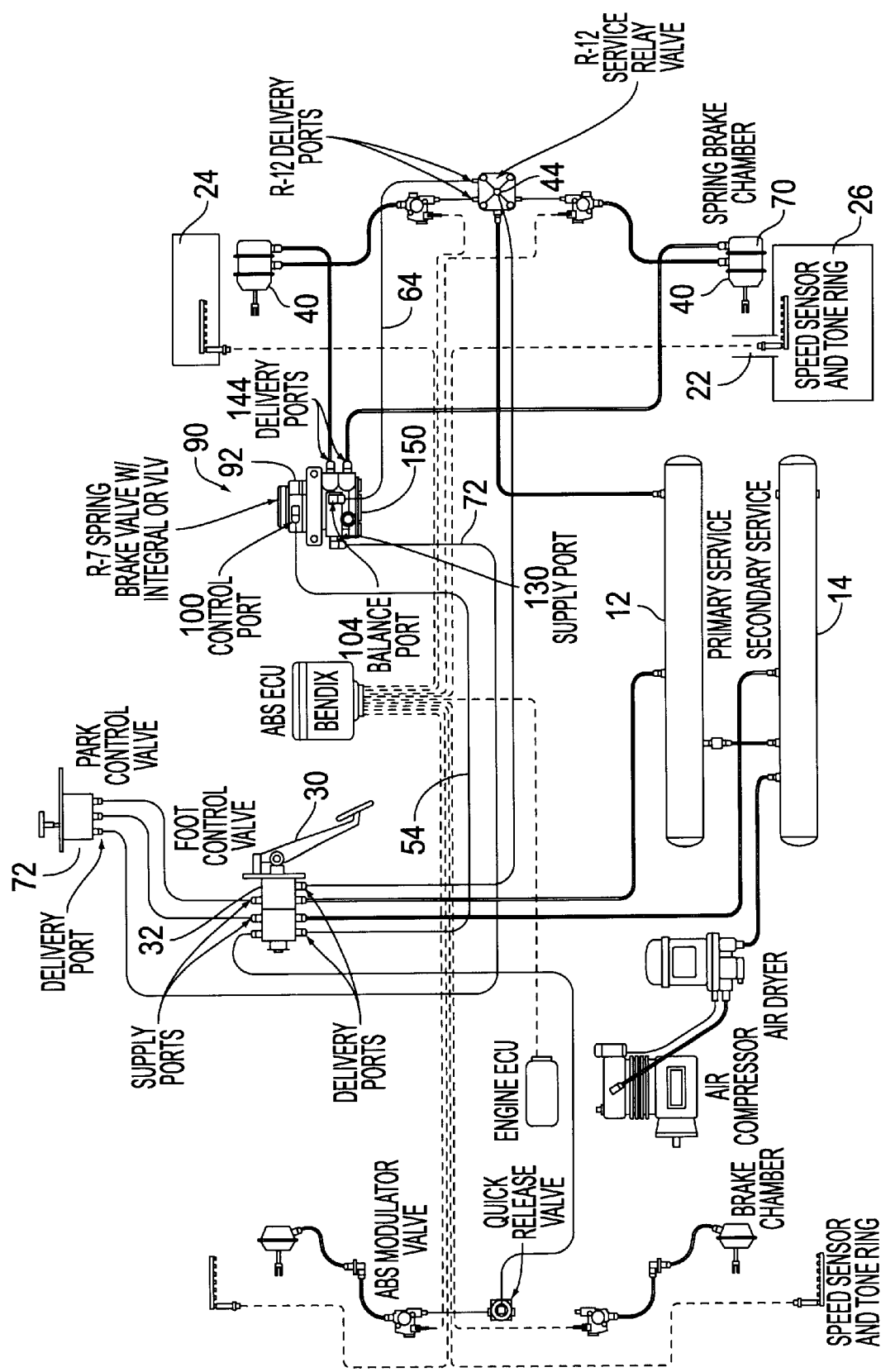
FIG. 2 is a schematic representation of the braking system in accordance with the teachings of the subject invention.
Figure 3:
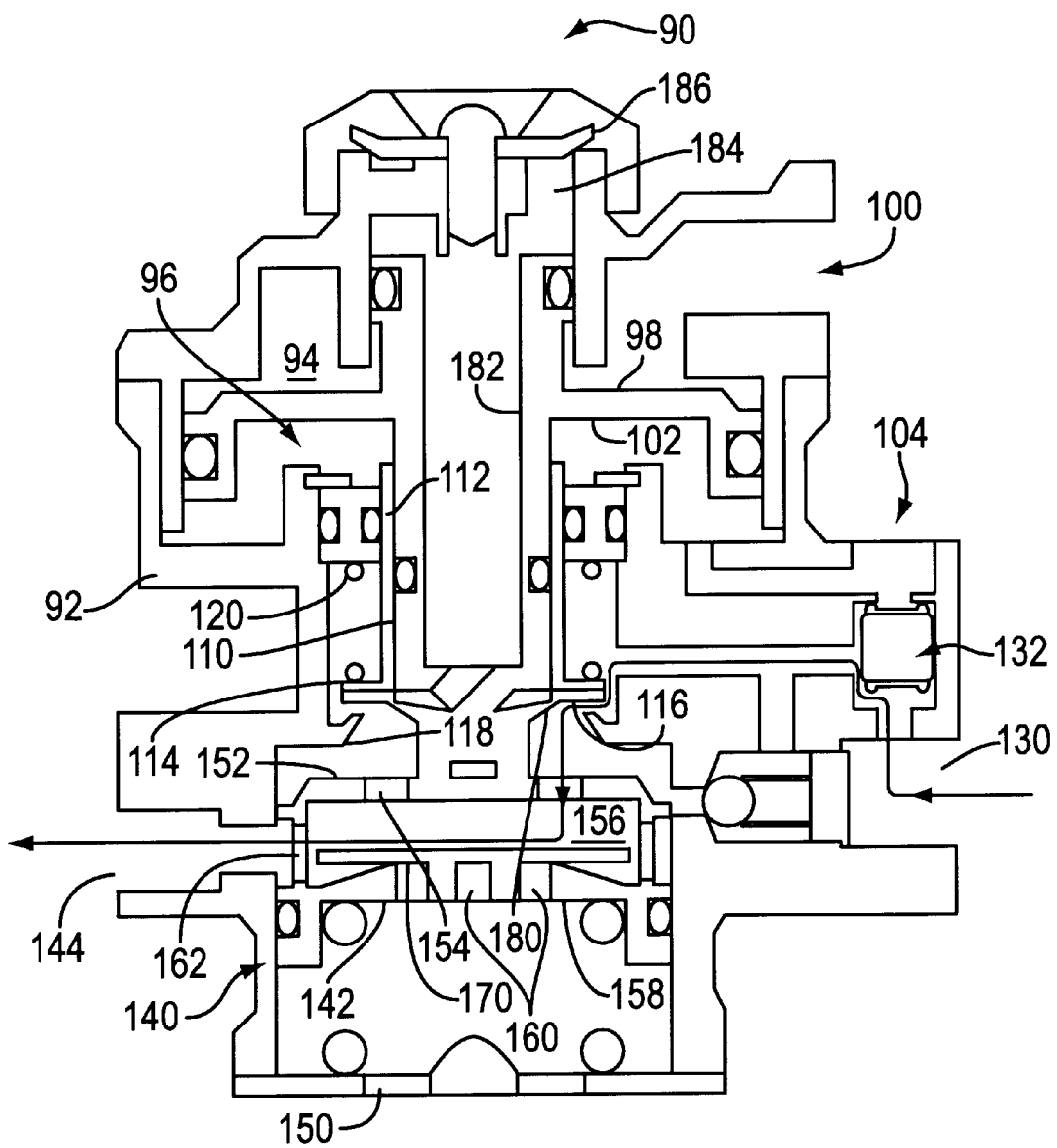
FIG. 3 is a longitudinal cross-sectional view of the integrated quick release valve and spring brake valve assembly.
Figure 4:
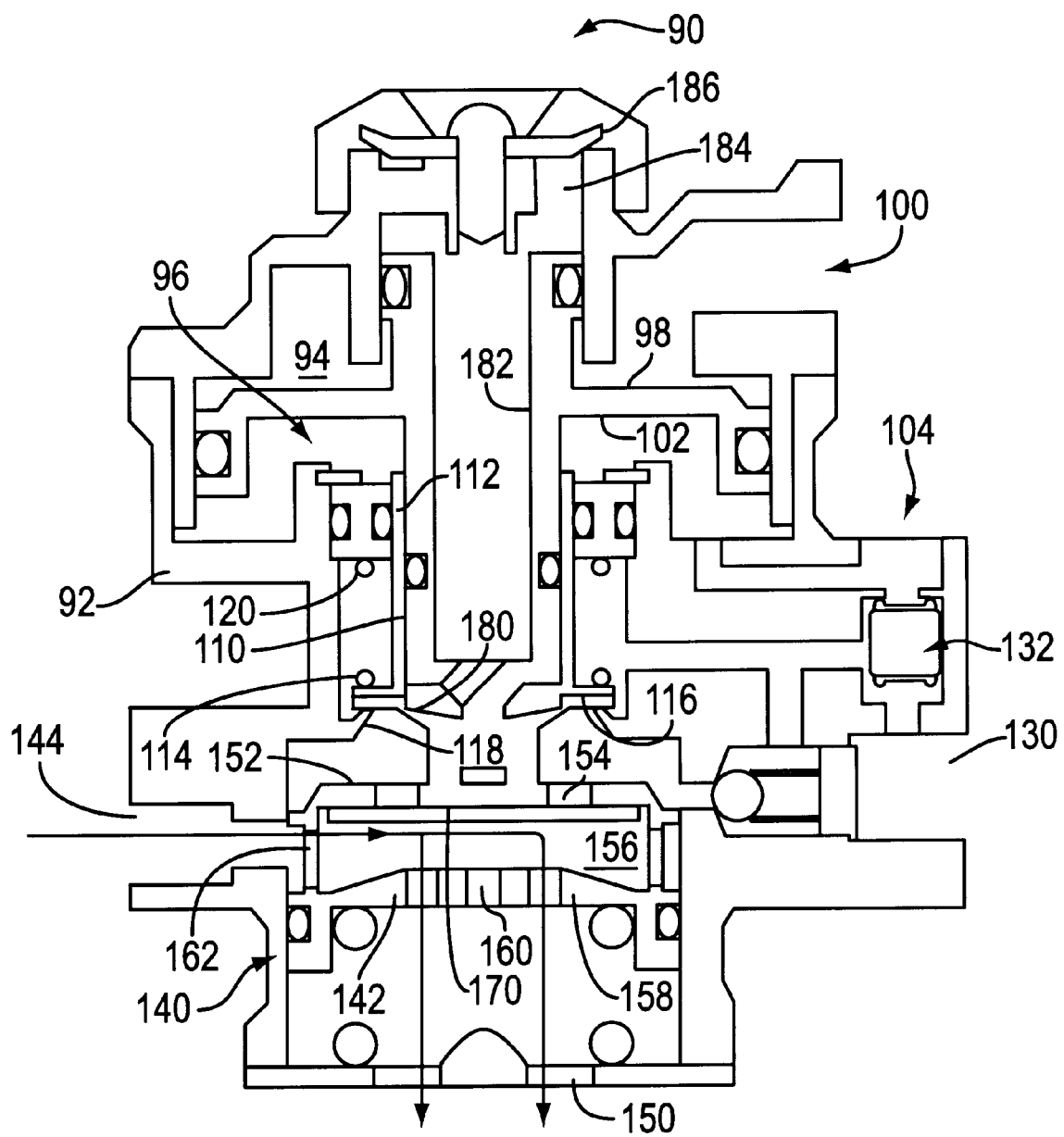
FIG. 4 is a view similar to FIG. 3 illustrating the communication between the delivery port and the exhaust port so that the spring brakes are applied.
Figure 5:
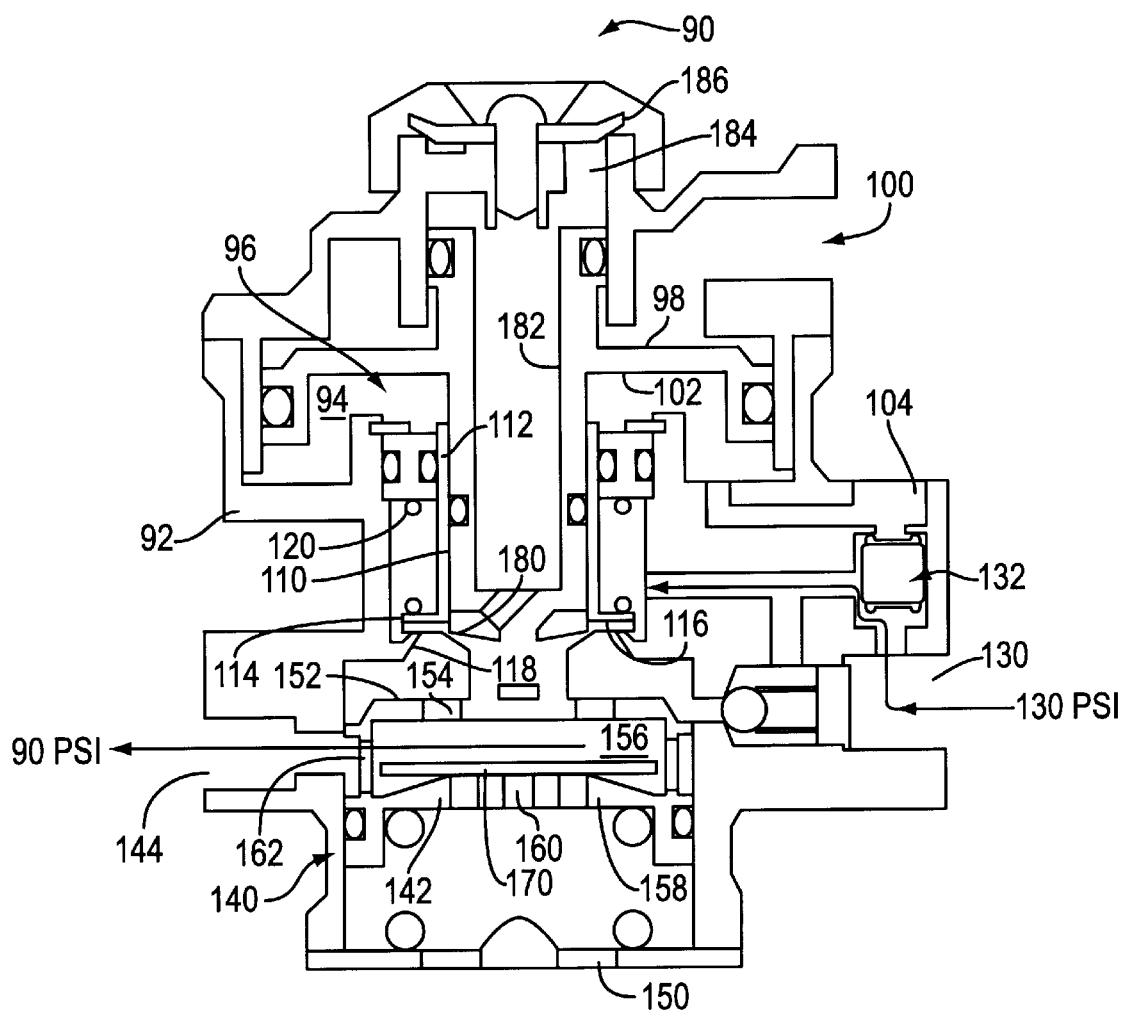
FIG. 5 illustrates the valve in a spring brake release position.

In the present arrangement, and as illustrated in FIG. 2, a modified spring brake valve having an integral quick release valve associated therewith is identified by numeral 90. A preferred embodiment of the spring brake valve with an integral quick release valve is illustrated in FIGS. 3–5. The valve includes a housing 92 having a chamber 94 receiving control piston 96. A first or upper face 98 of the piston is in communication with the secondary circuit via first or control port 100 (and a comparable line 54 of the secondary circuit). A second or lower face 102 of the piston communicates with the primary circuit via a second or balance port 104. As will be appreciated, the balance port 104 communicates via line 64 with the service relay valve. Thus as described above, if both the primary and secondary circuits are functioning properly, air pressure is provided to both the upper and lower faces of the control piston. The control piston thus remains in a balanced position as illustrated in FIG. 3. Extending from the second face of the piston is an elongated actuating rod 110. It extends through sleeve 112 which includes a radially extending shoulder 114 at its lower end, a bottom face 116 of which defines a seal face that selectively engages seat 118. A light biasing force provided by spring 120 urges the face 116 toward the valve seat.

Third or supply port 130 is connected to the park control valve 70 through line 72. Thus, double check valve 132 moves to the position shown in FIG. 3 when the primary circuit fails, since there is a lack of air pressure at port 104.

In accordance with the present invention, the integrated quick release valve is provided in the housing 92. More particularly, it includes a movable hollow piston 142 interposed between a third or supply port 130 and a fourth or delivery port 144. The delivery port communicates with the spring brake chamber to release or back off the mechanical spring brake (not shown). In addition, a fifth or exhaust port 150 is provided in the housing and is dimensioned to provide a quick release valve function that effectively exhausts the spring brake chamber by selectively communicating with delivery port 144 as will be described below. The balance piston 142 includes first or upper face 152 having openings 154 that communicate with an internal chamber 156 defined in the piston. Similarly, the lower face 158 includes openings 160 that communicate with the chamber 156 in the balance piston. It will be appreciated that the chamber 156 is in constant communication with the control port 154 via sidewall openings 162.

The preferred form of the quick release valve member is a diaphragm 170 received in the balance piston. The diaphragm is dimensioned for movement between selective covering relation with openings 154, and openings 160 in the upper and lower faces of the pistons, respectively. As shown in FIG. 3, the diaphragm 170 is urged into covering relation with the passages 160 so that the delivery port 144 cannot communicate with ambient or atmosphere through exhaust port 150. This position (FIG. 3) illustrates release of the mechanical spring brake since air pressure from the supply port flows past the valve seat 118, through openings 154 in the balance piston, and communicates with delivery port 144. In this manner, the spring brake chamber is pressurized and the spring brakes are maintained in a release position.

When the operator depresses the foot pedal, and when the primary circuit is in a failure mode, the control port 100 receives the pressurized air from the secondary circuit and urges the control piston downwardly (FIG. 4). Seal face 116 engages seat 118, and as the piston continues to move downwardly, a radial inner portion of seal face 116 disengages from seat 180 defined on the piston. This opens a flow path through hollow stem 182 of the control piston and initial exhaust flows out the exhaust port 184 past diaphragm 186. Then, the diaphragm 170 covers the passages 154 and provides for communication between the delivery port 144 and the exhaust port 150. Thus, FIG. 4 is illustrative of the spring brake apply condition in which the spring brake chamber communicates with ambient atmosphere when the diaphragm moves to the position shown and opens the passages 160 through the balance piston.

In FIG. 5, the spring brakes are released since the diaphragm 170 again covers passages 160. Air pressure (at approximately 90 psi in the preferred embodiment) is delivered to port 144 to release the spring brakes. Moreover, seal face 116 is engaged with the valve seat 118 to preclude further communication between the supply port and the delivery port. Thus, as will be appreciated, the present invention provides all of the features of the prior primary and secondary brake system as described with reference to FIG. 1. It has the advantage, however, of combining the spring brake quick release valve in an integral fashion in the housing 92 of the spring brake valve. This eliminates a component from the prior arrangement, thus eliminating complexity such as line 84 and the fittings associated with the connection between the separate spring brake quick release valve and the spring brake valve. In addition, due to the elimination of line 84, the volume is reduced thus improving the response so that air is more quickly exhausted from the spring brake chamber while maintaining sensitivity of the foot control valve. It will also be appreciated that reduction in the number of components leads to decreased service problems since there are less components that are likely to fail. All of these risks are reduced due to integrating the quick release valve into the balance piston which is contained in the spring brake valve housing.

The invention has been described with reference to the preferred embodiment. Obviously, modifications and alterations will occur to others upon a reading and understanding of the detailed description. The invention is intended to include such modifications and alterations in so far as they come within the scope of the accompanying claims and equivalents thereof.

What is claimed is:

1. A valve assembly for controlling application of a spring brake in a truck brake system having a primary and a secondary circuit, the valve including:
   a housing having a first port in communication with a primary circuit and a second port in communication with a secondary circuit, a third port communicating with a spring brake chamber that deactuates the spring brake, and a fourth port communicating with ambient;
   a first chamber in the housing receiving a control piston therein, the first and second ports communicating with the first chamber for supplying pressure to opposite faces of the control piston;
   a valve member in the housing interposed between the third and fourth ports for selectively connecting the spring brake chamber with ambient in response to a predetermined pressure differential between the first and second ports.

2. The valve assembly of claim 1 wherein the valve member is a diaphragm dimensioned to selectively seal between the third and fourth ports.

3. The valve assembly of claim 1 further comprising a fifth port communicating with a park control valve to selectively release control release of the spring brake.

4. The valve assembly of claim 3 wherein the valve member is a diaphragm that selectively closes the fourth port and establishes communication between the third port and the fifth port to modulate the spring brake in the absence of pressure at the first port.

5. The valve assembly of claim 1 wherein the valve member is a diaphragm received in a balance piston interposed between the third and fourth ports.

6. The valve assembly of claim 5 wherein the balance piston includes openings in upper and lower faces thereof and the diaphragm is interposed between the upper and lower faces and selectively covers the openings therein.

7. An integrated spring brake valve and quick release valve combination for modulating application of a spring brake in the absence of air pressure from a primary circuit, the valve combination comprising:
   a housing having a chamber receiving a control piston therein movable between actuated and deactuated positions in response to air pressure in primary and secondary braking circuits; and
   a quick release valve received in the housing for selectively connecting a spring brake chamber port with ambient to apply an associated spring brake and selectively connecting the spring rake chamber port with a park control valve port to modulate application of an associated spring brake.

8. The combination of claim 7 wherein the quick release valve is moved to connect the spring brake chamber to ambient in response to movement of the control piston.

9. The combination of claim 7 wherein the primary and secondary circuits are operatively associated with opposite faces of the control piston.

10. The combination of claim 7 wherein the quick release valve includes a diaphragm interposed between a delivery port operatively connected with an associated spring brake chamber and an ambient port.

11. The combination of claim 10 wherein the diaphragm is received in a balance piston interposed between a supply port connected with an associated park control valve.

12. The combination of claim 11 wherein the balance piston includes openings in upper and lower faces thereof and the diaphragm is interposed between the upper and lower faces of the balance piston.

* * * * *